Feb. 11, 1958          L. W. GACKI          2,823,318

EXPANSIBLE BRACE FOR FILM CASSETTE

Filed Dec. 16, 1954          2 Sheets-Sheet 1

L.W. GACKI

*INVENTOR.*

BY L. P. Smithers

United States Patent Office 2,823,318
Patented Feb. 11, 1958

2,823,318

EXPANSIBLE BRACE FOR FILM CASSETTE

Leonard W. Gacki, Jamaica, N. Y., assignor to X-Ray Instrument Corporation, a corporation of New York Application December 16, 1954, Serial No. 475,805

6 Claims. (Cl. 250—68)

This invention relates to film cassettes. Particularly the invention refers to an elastic liner which serves concomitantly as a reinforcement for the frame of an X-ray film cassette and as an efficient light seal.

The frames of X-ray film cassettes of the prior art fundamentally are not well adapted to darkroom use. The hollow, rectangular construction generally adopted lacks inherent rigidity and strength which, without additional support, renders cassette frames incapable of maintaining sensitive recording materials in critically correct position with respect to film supporting plates and to the person of a photographic subject. To compensate for the inadequacy, it is customary to affix bracing rails or rods to the inner surface of frame members. The compromise is not successful because unavoidable rough handling in darkrooms and the forceful, repetitive manipulation necessitated by the insertion and removal of these bracing members and their attendant fastenings and the compressive application of covers and clamping members after every exposure, eventually strains the cassette frame at joints and abutments, causing bending and separation of frame members with consequent light leaks. Furthermore, the use of bracing rails and rods, usually of metal, and the accessory fastenings for these parts, entails extra machining and finishing operations which inordinately increase manufacturing expense. So far as is known, attempts to correct these inherent shortcomings have not been successful. Increasing the weight of frames or utilizing heavier bracing members merely adds to the strain upon joints and connections and further shortens the operating life of the cassette. The general object of the present invention, therefore, is to provide a distinctly new and improved liner for the frame of an X-ray cassette that requires no accessory fastening members and which, in its own structure, provides the necessary rigidity and support for frame and cover members under the most stringent operating conditions.

Accordingly, it is an object of the invention to provide a compact, lightweight bracing member, compressibly insertable as a unit within the frame of an X-ray film cassette.

It is a further object of the invention to provide a bracing liner tensionably insertable within the frame of a film cassette to serve concomitantly as an efficient light seal.

Another object of the invention is the provision of a one-piece, bracing member adapted to conterminous fitting within the frame of an X-ray film cassette to serve as an effective light inhibitor at all points of contact between the frame and the supporting plate.

A still further object of the invention is the provision of a comparatively inexpensive, formed, expansible liner, compressibly insertable and removable from within the frame of an X-ray film cassette.

For a better understanding of the invention together with other and further objects thereof, reference is had to the drawings and description in connection with the appended claims defining its scope.

Figure 1:
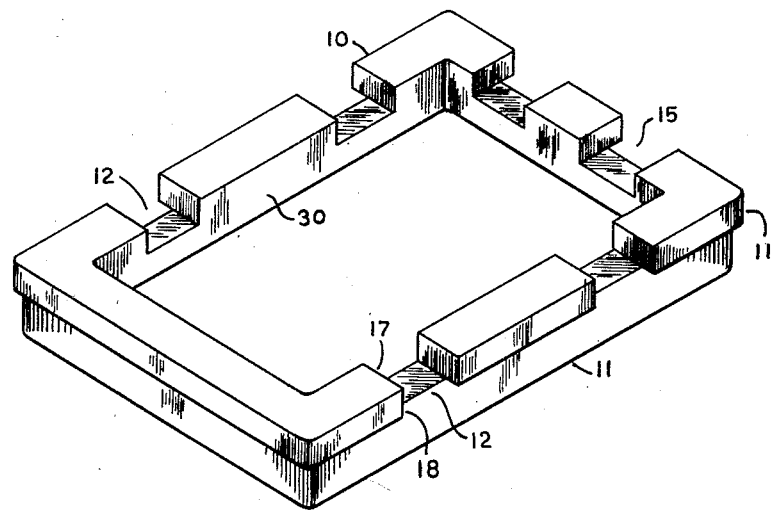
Fig. 1 is an isometric view of the light sealing brace of the invention.

The light sealing, bracing liner 10, of Fig. 1, preferably may be formed as a one-piece structure of plastic, for example, Vinylite, neoprene, or other suitably lightweight material having a generally irregular form adaptable to insertion within the frame of a film cassette. The process by which the liner is fabricated forms no part of the invention claimed herein. It will be understood, however, that the outer walls 11, of the liner, are contoured to fit conterminously with the inner side walls of a cassette frame in a manner and for purposes which will be described hereafter. Spaces 12 represent portions of the liner structure cut away, preformed in a mold, or otherwise removed, to provide clearance for movement of swivelling cover clamps 13, tensionably insertable beneath frame flange 14, or other part of the frame, to maintain the usual cassette cover, when closed, in firm contact with sensitive recording materials, stacked and supported between the cover and a supporting plate in a manner well understood in the art. Customarily, in cassettes equipped with swivelling cover clamps, pin stops must be inserted at appropriate locations along the cassette frame to limit the locking movement of these elements. This necessitates additional machining of frame members which can be eliminated when the bracing inner of the invention is applied. Abrupt terminals 17, of the liner are conveniently available as built-in stop members 18, which may be molded integrally with the liner, or otherwise formed therewith, prior to installation, to serve the purpose of the machined stops previously mentioned. The staggered arrangement of the cut away side portions to provide the necessary clearance for manipulation of the swivelling clamps is clearly indicated in Fig. 2.

Figure 2:
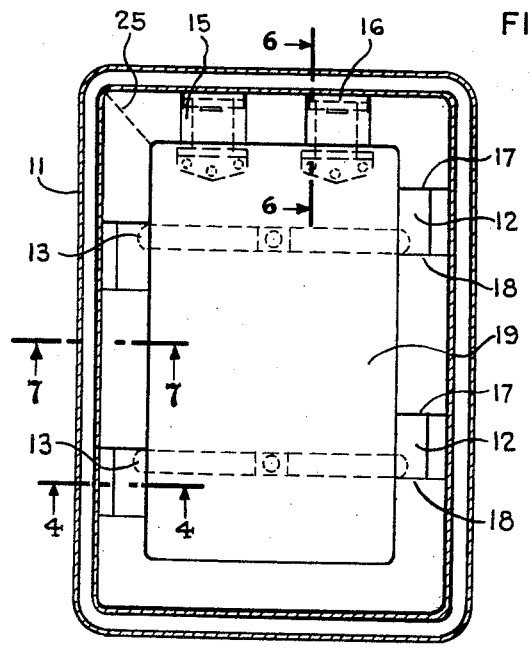
Fig. 2 is a plan view of the light sealing liner positioned within the frame of a cassette. In this figure, the flanged top wall of the frame has been removed and the cassette parts are indicated by dotted lines.

Similarly, other portions 15, of the liner may be removed to provide for the installation and free movement of hinges 16, supporting the cassette cover 19. Details of the clamps and hinges as associated with the liner so far described, are indicated in Fig. 2. For purposes of clarity, the top wall or flange 14 is not shown in this figure, the outer wall of the cassette frame 11, representing the line of removal of the flange 14, shown more clearly in Figs. 4 and 6. Notable also in this figure are dotted lines 25, indicating corner abutments of separate frame sections which are completely blocked off by the inserted liner member. Corner abutments of cassette frame sections are commonly welded together when cassette frames are fabricated. Nevertheless, they are subject to damage and separation. It will be apparent that the light sealing properties of the bracing liner of the invention will effectively prevent the intrusion of light through these and other abrasions or faults in the outer structure. Other frame locations, equally vulnerable to light penetration, will be pointed out hereafter.

Figure 3:
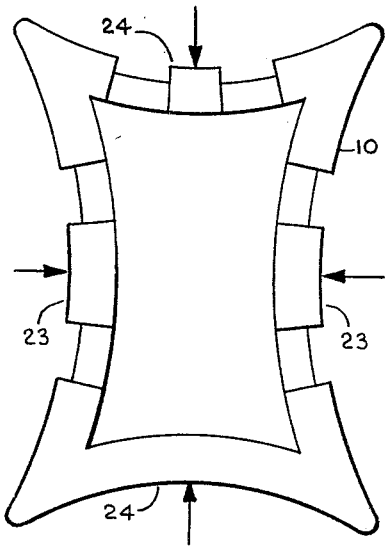
Fig. 3 is a plan view of a light sealing, bracing member with its sides pinchably compressed and ready for insertion within the cassette frame.

Fig. 3 depicts the bracing liner under pinching stress of coupled forces indicated by arrows and applied by hand, tool or fixture, normally of opposite sides 23—23, 24—24. By thus contracting the liner form and reducing its over-all area, it may be conveniently inserted within the cassette frame. The material selected for the liner should have sufficient resiliency to provide the necessary compressibility of the liner structure for preliminary insertion by hand, supplemented if necessary, by the application of a hand tool or fixture, to bring the liner and the frame into the essential conterminous fitting. Upon release of the applied tension, the liner form will expand, but under restraint of the cassette walls it will continue to exert a permanent, outward thrust or bracing effect, upon all points of contact between the liner and the frame.

It should be noted that when the liner is properly positioned within the frame walls, its residual tension is sufficient to maintain it in operative bracing position without screws or other accessory fittings. Rivets or screws can be highly objectionable when used in a film cassette. Their use necessitates extra careful machining, otherwise burrs or other imperfections are likely to chew or macerate the felt cloths customarily applied for light sealing, thereby increasing the susceptibility of the structure to penetration by unwanted light. As a further feature, if the liner is formed of synthetic material, it may be colored or otherwise rendered impervious to visible light by techniques known in the art. Thus the light sealing liner may function as an efficient light inhibitor. Its precisely contoured outer surface may fill every recess and tightly surround every projection of the inner surface of the cassette frame, presenting an impenetrable, rigidly unyielding block to the passage of extraneous light. It may be fitted permanently within the frame by cementing or gluing, or it may be detachably applied to facilitate removal or replacement. It may be preformed in a mold to jacket the frame interior partially or completely.

Figure 5:
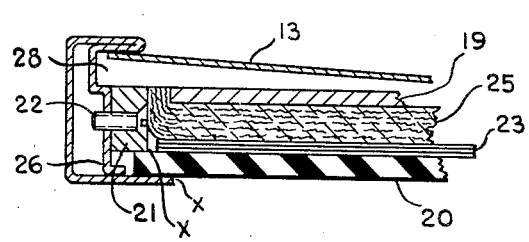
Fig. 5 is a cross sectional view of a conventionally fabricated cassette with bracing rail or rod screwed to the frame.

Fig. 5 represents a cross sectional view of an X-ray film cassette employing conventional metallic bracing rail members 21, rigidly fixed to the frame by screws 22, for clampable association with a supporting plate 20. Structures of this general type frequently have walls perforated to provide for the installation of cover hinges and clamps. Cutting away the basic frame structure in this manner not only weakens the frame but adds an additional hazard to perfect light sealing. Examination of the cassette frame structure of this figure will indicate that comparatively minute bending or displacement of the frame surface, particularly at points of contact x, between the frame and the plate, between the rail and the plate or frame, or in the vicinity of cutout portions of the frame, as in many conventionally designed structures, may cause the parts to spring and separate, thereby endangering the critically light tight condition of the X-ray film upon support 23. It will be further noted that conventional bracing rail member 21 is in contact with a very inconsiderable part of the inner frame wall 26, of the cassette, and has no contact at all with recess 28. The adjacency of the screw heads and the soft, easily torn, light sealing curtain material 25, also is notable.

Figure 4:
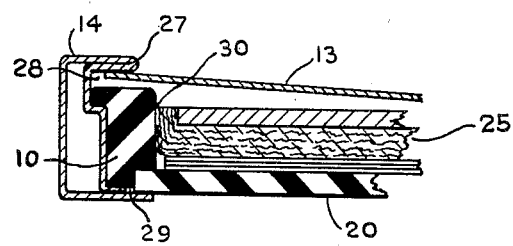
Fig. 4 is a cross sectional view, along lines 4—4, of Fig. 2, of an X-ray film cassette and the bracing liner of the invention illustrating means for applying conventional, swivelling, cover clamps with the liner in place.
Figure 6:
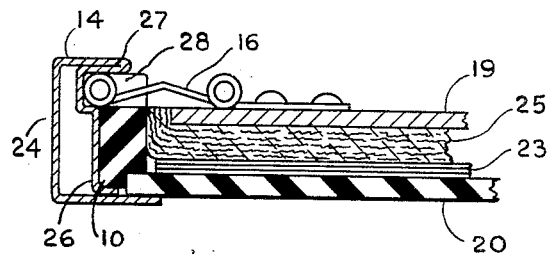
Fig. 6 is a cross sectional view, along lines 6—6, of Fig. 2, showing a preferred form of cassette with a light sealing brace fitted conterminously within the frame and illustrating means for applying cover supporting hinges with the liner in place.

Contrasting with the conventional apparatus just described are Figs. 4 and 6. Details of one method of providing clearance for swivelling cover clamps 13 are shown in Fig. 4. Here, the liner 10 does not extend completely into frame recess 28, but is foreshortened to provide clearance for the free movement of swivelling clamp members. The liner does project, however, into the recess or well 29, between the inner frame wall and the plate 20, and is stepped to overlap peripherally and brace the plate as previously mentioned. Synthetic plates in film cassettes are troublesome. Under conditions of changing temperature, they tend to warp. When used with metal frames, it is customary to provide space between the plate and the frame to allow for dimensional changes in the plastic. This instability of the plate material disturbs the essential parallel relationship between the supporting plate and the recording film and causes the image to blur, rendering interpretation of pictures difficult. When the bracing liner of the invention is utilized, the plate and the liner in contact exhibit sufficient resiliency to overcome or substantially reduce the tendency to warpage. It will be observed also, that the straight, tacitly smooth, inner surface of the liner 30, offers no obstruction to the insertion of felt, light sealing curtain 25, or to its compression under forceful closure of cassette cover 19. If, at any time, it becomes necessary to remove the supporting plate, the liner is simply compressed, as previously described, and lifted from within the frame.

Figure 7:
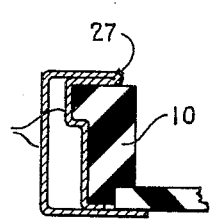
Fig. 7 is a cross sectional view, along lines 7—7, of Fig. 2, differing from Fig. 4, in that the liner completely fills the inner recesses of the frame.

Fig. 6 illustrates a preferred form of cassette frame and liner. The formation of the liner to provide clearance and free movement of cover hinges 16 is clearly shown. Frame 14 may be recessed, as previously described, to provide for the installation and support of cover hinges after the insertion of the liner. Cut away portions 15, as described in connection with Fig. 2, provide the necessary clearance for the opening and closure movement of the hinges. The liner may project completely into frame recess 28, and well 29, completely filling same, as shown in Figs. 6 and 7, to bracingly overlap and compress the supporting plate. It will be clear that the outer surface of the liner member could be adapted with equal facility to a variety of differently formed frame structures. For simplicity, however, the straight line frame structure of the present disclosure, with recess immediately below the folded and crimped flange member 27, is believed sufficiently indicative of the adaptability of the bracing liner of the invention.

Having described the structural features and purposes of the invention, what is set forth as new is enumerated in the appended claims. What is claimed is:

1. A compressible, molded liner for the frame of an X-ray film cassette comprising a molded form insertable within said frame and having portions of its structure removed to provide for the free movement of clamps restrainably associated with said frame; projections of said form providing stops limiting the movement of said clamps.

2. A molded plastic, generally rectangular, compressible form of solid cross section, insertable upon the application of paired pinching stresses within the frame of an X-ray film cassette; said form having portions of its structure removed to provide space for the attachment of hinges to said frame and to provide clearance for the free movement of clamping members restrainably associated with said frame.

3. A light sealing bracing liner for the frame of a film cassette and a plate supported thereby, comprising a preformed, hollow frame member of substantially rectangular cross section, compressibly insertable for conterminous fitting within the walls of said frame; said frame having portions of its structure removed to provide clearance for the free movement of hinges and clamps associated with said cassette frame; the residual tension of said liner serving to maintain it operatively within said frame to serve as a brace therefor, and concomitantly as an effective light seal.

4. In an X-ray film cassette the combination comprising a frame and a recess extending continuously around the inner surface thereof; hinges attached to said frame and a cover supported thereby; clamps on said cover; a one-piece form contoured exteriorly to mate with the inner surface of said frame and to extend into said recess; said form being detachably insertable within said frame by compression of its opposite sides and having portions of its structure removed to provide clearance for the free movement of said hinges and said clamps.

5. The invention set forth in claim 4, and wherein the surface of said liner provides a stop limiting the free movement of said clamps; and the removed portions of said liner are staggered with respect to one another.

6. In an X-ray film cassette, the combination comprising a frame; a one-piece liner member having the form of a hollow rectangle formed of material rendered impervious to visible light and being compressibly insertable within said frame to extend continuously around the inner surface thereof and in continuous contact with the surface of a plate supported thereby; said liner being retained within said frame by tension alone to serve as an effective light inhibitor at all points of contact between said frame and said plate.

References Cited in the file of this patent

UNITED STATES PATENTS

| | | |
|---|---|---|
| 2,357,969 | Powers | Sept. 12, 1944 |
| 2,666,855 | Gacki et al. | Jan. 19, 1954 |